United States Patent
Michail et al.

(10) Patent No.: US 8,274,516 B2
(45) Date of Patent: Sep. 25, 2012

(54) GPU SCENE COMPOSITION AND ANIMATION

(75) Inventors: Ashraf Michail, Redmond, WA (US); Gerhard Schneider, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 716 days.

(21) Appl. No.: 12/185,114

(22) Filed: Aug. 4, 2008

(65) Prior Publication Data

US 2010/0026700 A1    Feb. 4, 2010

(51) Int. Cl.
*G06T 15/00* (2011.01)
*G06T 15/50* (2011.01)
*G06T 15/60* (2006.01)
*G00T 13/00* (2006.01)
*G09G 5/00* (2006.01)
*G06F 3/048* (2006.01)

(52) U.S. Cl. ........ 345/501; 345/419; 345/426; 345/473; 345/582; 715/706; 715/782; 715/861

(58) Field of Classification Search ........................ None
See application file for complete search history.

(56) References Cited

U.S. PATENT DOCUMENTS

| | | | |
|---|---|---|---|
| 6,215,495 B1 | 4/2001 | Grantham et al. | |
| 6,243,856 B1 | 6/2001 | Meyer et al. | |
| 6,266,053 B1 | 7/2001 | French et al. | |
| 6,487,565 B1 | 11/2002 | Schechter et al. | |
| 6,707,456 B1 | 3/2004 | Marrin et al. | |
| 7,088,374 B2 | 8/2006 | David et al. | |
| 7,126,606 B2 | 10/2006 | Beda et al. | |
| 7,265,756 B2 | 9/2007 | Schneider et al. | |
| 7,836,087 B1 * | 11/2010 | Gregory et al. | 707/793 |
| 2003/0090523 A1 * | 5/2003 | Hayashi et al. | 345/782 |
| 2005/0125369 A1 | 6/2005 | Buck et al. | |
| 2005/0151747 A1 | 7/2005 | Kim et al. | |
| 2007/0070077 A1 * | 3/2007 | Hsu | 345/582 |
| 2008/0024510 A1 * | 1/2008 | Lee et al. | 345/582 |
| 2008/0049031 A1 | 2/2008 | Liao et al. | |

OTHER PUBLICATIONS

International Search Report, mailed Mar. 15, 2010, 10 pages.
Bethel, et al., "Hierarchical Parallelism in a Scene Graph", Submitted to the 2001 IEEE Symposium on Parallel and Large-Data Visualization and Graphics (PVG 2001).
"Chapter1—Introduction", Cg Tutorial at www.nVidia.com Developer site, posted Sep. 22, 2004.

* cited by examiner

*Primary Examiner* — Xiao M. Wu
*Assistant Examiner* — Matthew D Salvucci

(57) ABSTRACT

Architecture that expresses scene composition and animation in a form that can run entirely on the graphics processing unit (GPU). The architecture stores retained graph information (e.g., scene graph and animation information) as texture information, and uses shaders (e.g., vertex and pixel) to evaluate time information, evaluate animation, evaluate transforms, and rasterize paths. Additionally, the architecture provides the ability to compute animation positions and redraw entirely on the GPU without per primitive CPU intervention.

18 Claims, 7 Drawing Sheets

GPU SCENE COMPOSITION AND ANIMATION

BACKGROUND

The central processing unit (CPU) of computing devices and systems is under increasing pressure to handle more complex processes as applications and data become more diverse. In response, vendors have been designing and providing specialized processors for specific applications such as for signal processing, graphics processing, industrial control systems, and the like.

Many applications that utilize computer graphics can place an inordinate demand on the CPU for graphics processing. In most graphic applications the processing is shared, where some of the work is performed using the CPU and some of the work is passed to the graphics processing unit (GPU). Classically, machine graphics was implemented on the CPU. Vendors are now designing increasing amounts of memory and processing power on the GPU. At the same time, computing vendors are addressing this problem in part by implementing multi-core CPUs.

In modern user interface scenarios, the number of visual elements in a scene is increasing. It is not uncommon to have applications that produce 10,000 to 50,000 visual elements. Producing fast display and animation for such scenarios is challenging. The GPU computation improves upon CPU-based graphics computation with significantly more parallelism, better memory bandwidth, and specialized hardware for graphics operations. However, the conventional GPU is constrained as a graphics processing component.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture expresses the scene composition and animation in a form that can run entirely on the graphics processing unit (GPU). The architecture stores the scene graph and animation information as texture information, and uses shaders (e.g., vertex and pixel) to evaluate time information, evaluate animation, evaluate transforms, and rasterize paths. In other words, disclosed is the ability to store animation information and hierarchical scene graph information in textures. Additionally, the architecture provides the ability to compute animation positions and redraw entirely on the GPU without per primitive CPU intervention.

To the accomplishment of the foregoing and related ends, certain illustrative aspects are described herein in connection with the following description and the annexed drawings. These aspects are indicative of the various ways in which the principles disclosed herein can be practiced, all aspects and equivalents of which are intended to be within the scope of the claimed subject matter. Other advantages and novel features will become apparent from the following detailed description when considered in conjunction with the drawings.

DETAILED DESCRIPTION

Figure 1:
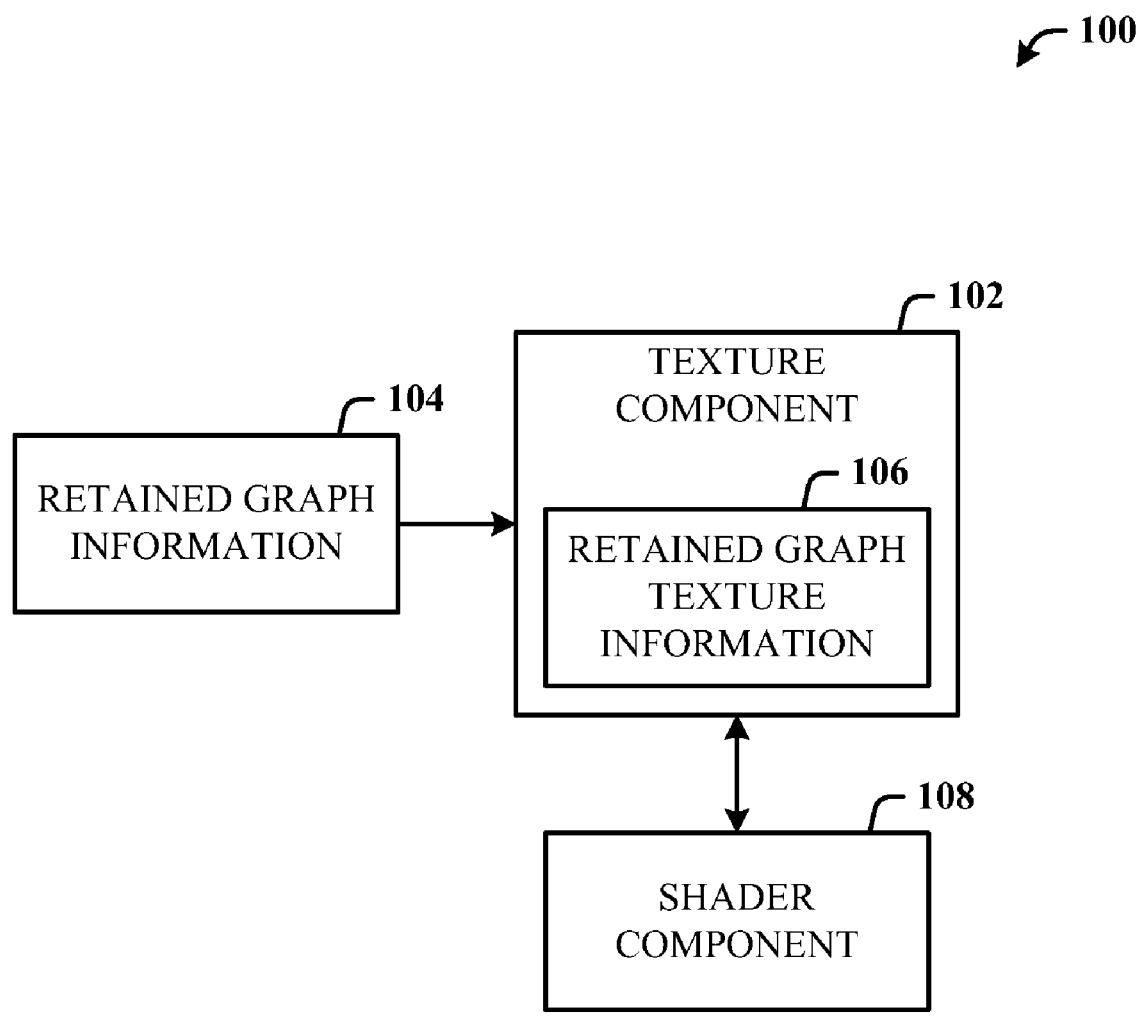
FIG. 1 illustrates a graphics processing system for processing scene and animation information on a GPU.

The disclosed architecture takes a generic scene graph API system and moves the work that is performed via the graphics processing unit (GPU) higher up in the stack to have the scene graph itself being stored in video memory and evaluated by the GPU, and the animation system as well being stored in texture memory and evaluated by the GPU. This eliminates per element CPU costs. For example, with respect to per element CPU costs, consider one million elements. In conventional methods there is some CPU work that reiterates and performs render processing on each of the million elements. Then, the GPU performs some other part of that rendering process.

While the herein described implementation uses the more common shader based computing model, the architecture may also be implemented using general purpose computing models that target the GPU and which are not based on the classic graphics pipeline shader model, and employ a suitable API.

In the disclosed architecture, the number of elements in the scene graph is inconsequential from the perspective of CPU work. There can be CPU work done to call the driver to make a certain number of draw calls. After the scene graph is configured, however, scene processing does not utilize per element CPU work. The per primitive work is performed by the GPU, which leads to several orders of magnitude higher scalability. The traditional limit for real-time animation may be 1,000 or 10,000 elements with CPU work involved. When offloading this work to the GPU, 100,000 to 500,000 elements can be involved, for example. Accordingly, several orders of magnitude in scalability improvement are realized based on the parallel processing capability in GPUs. By offloading scene graph and animation systems benefits can be obtained from the parallelism capability of GPUs thereby achieving significantly higher scale in terms of number of primitives that can be drawn per frame.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a graphics processing system 100 for processing scene and animation information on a GPU. The system 100 includes a texture component 102 for converting retained graph information 104 into retained graph texture information 106, and a shader component 108 for evaluating the retained graph texture information 106 entirely via the GPU.

The shader component 108 can include one or more pixel shaders, one or more vertex shaders, one or more geometric shaders, and/or one or more stream processors, for example, for evaluating scene graph transforms and rasterizing paths. The retained graph texture information 106 can include timing information stored as texture information, position information stored as texture information, and/or animation information stored as texture information. The shader component 108 includes a pixel shader for composing multiple levels of a transform hierarchy and a vertex shader for applying the transforms to geometry.

Figure 2:
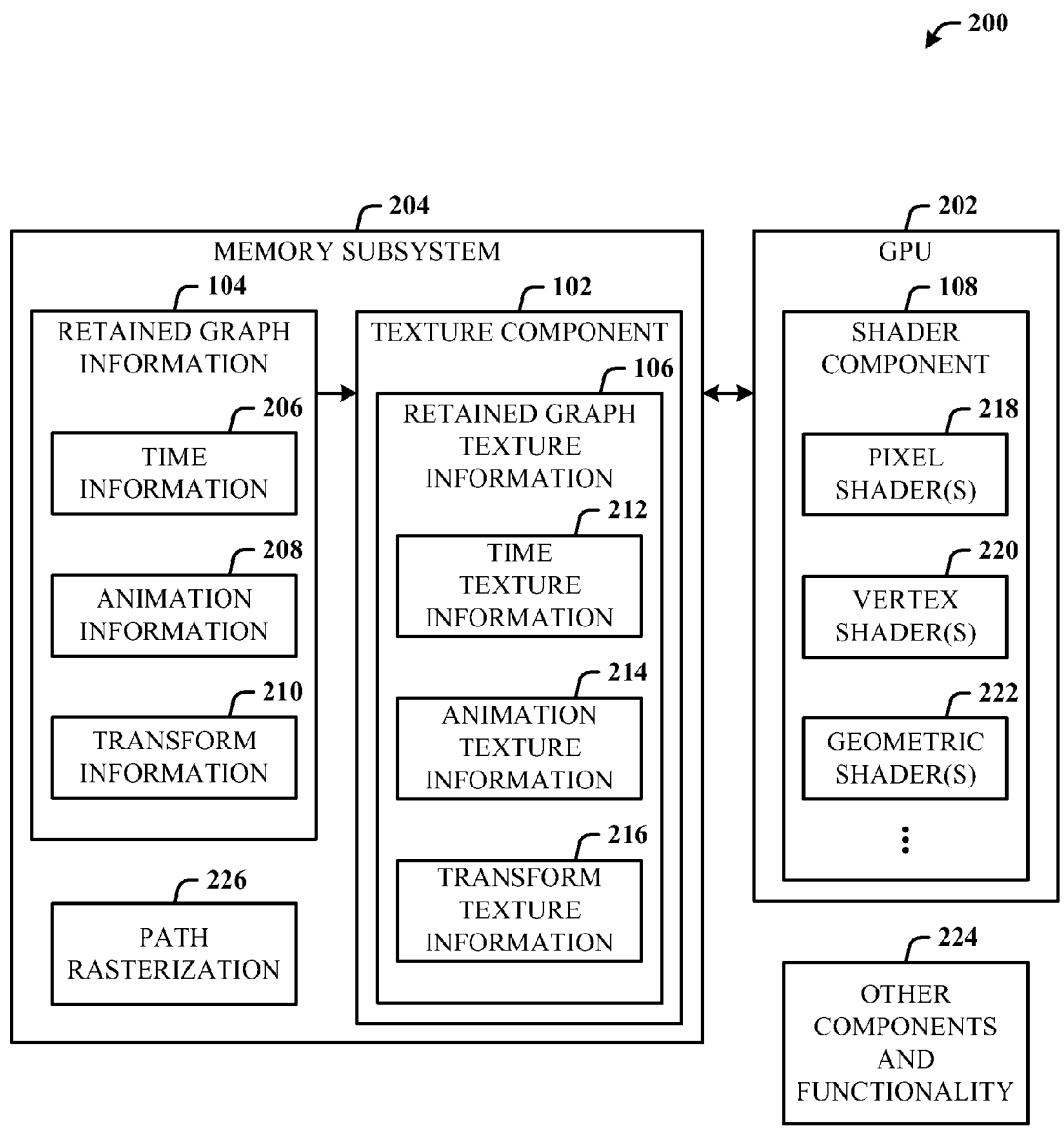
FIG. 2 illustrates a more detailed example of a graphics processing system for processing scene and animation information via a GPU.

FIG. 2 illustrates a more detailed example of a graphics processing system 200 (e.g., a daughter card to a mainboard, integrated on the mainboard, etc.) for processing scene and animation information via a GPU 202. The graphics processing system 200 can further be associated with a memory subsystem 204 for storing programs and data associated with graphics processing. The memory subsystem 204 can represent a discrete memory only for GPU use or memory also associated with the CPU. For example, the memory subsystem 204 can include the retained graph information 104 as input to the texture component 102 for creation (storing) of the retained graph texture information 106. As illustrated, the retained graph texture information 106 includes time information 206, animation information 208, and transform information 210. The texture component 102 stores (or creates) the retained graph information 104 in texture data as the retained graph texture information 106, resulting in time texture information 212, animation texture information 214, and transform texture information 216.

The GPU 202 can also comprise the shader component 108 for shader processing of the retained graph texture information 106 to output the desired effects. The shader component 108 is illustrated as providing shader processing for one or more pixel shaders 218, one or more vertex shaders 220, one or more geometric shaders 222, and other shaders, as the user may desire using suitable protocols and instructions. The one or more pixel shaders 218, one or more vertex shaders 220, one or more geometric shaders 222, etc., are employed to process the time texture information 212, animation texture information 214, and transform texture information 216. This is described in detail herein below.

Note that the graphics processing system 200 also includes other components and functionality 224 for providing inputs and outputs, processing, etc., to mainboard processes (e.g., the CPU), other client machines or devices in which the GPU architecture is implemented.

In other words, the graphics processing system 200 can comprise the texture component 102 in the GPU 202 for converting the retained graph information 104 into the retained graph texture information 106, one of the pixel shader(s) 218 of the GPU 202 for evaluating time information as time texture information, and one or more of the vertex shader(s) 220 and a pixel shader of the GPU 202 for evaluating for transform composition as transform texture information.

The retained graph texture information 106 includes the time texture information 212, the animation texture information 214, and the transform texture information 216, all evaluated entirely on the GPU 202. One of the pixel shader(s) 218 can be employed for evaluating the animation texture information 214 and progress texture information (described below). In other words, the pixel shader evaluates a hierarchy of transforms and the vertex shader applies the resulting transforms to path vertex data. The system 200 further comprises a shader for rasterizing paths 226. The vertex shader(s) 220 further evaluate transform hierarchy and path vertex data. This is described below.

Figure 3:
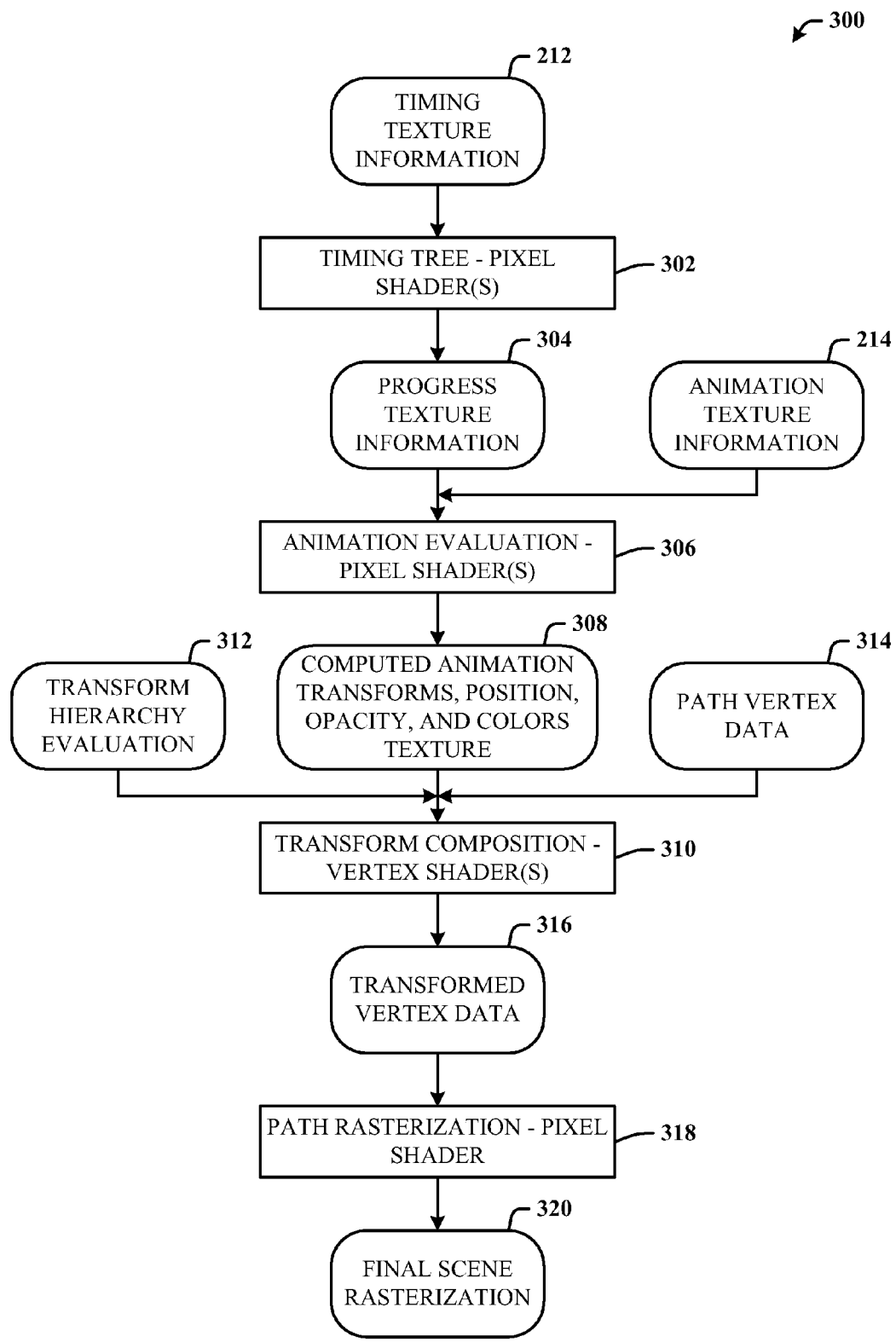
FIG. 3 illustrates a flow/block diagram for providing scene composition and animation in a GPU.

FIG. 3 illustrates a flow/block diagram 300 for providing scene composition and animation in a GPU. The rounded blocks represent the corresponding texture data that is stored in texture memory. The cornered blocks represent the shaders (e.g., pixel, vertex, geometric) that can be utilized available on the GPU.

The diagram 300 begins with the timing information stored as the timing texture information 212. The timing information can be represented as a timing tree, converted into the timing texture information 212, and input to one or more pixel shaders 302. The output of the pixel shader(s) 302 (similar to pixel shader(s) 218 of FIG. 2) includes progress information stored as progress texture information 304. The progress texture information 304 is then passed to one or more pixel shader(s) 306 along with animation information stored as animation texture information 214.

The input animation information can be a graph of elements with timing information (e.g., parent information) that indicates, for example, start at time five and continue for five seconds. A child timing description based on the parent timing information can be to start at time zero relative to the parent, continue for one second, and then repeat continuously. In the case timing or transforms are a tree, multiple passes are performed, in the general case. The shader can evaluate only a constant depth in a single pass. In the most general case, there can be one shader pass per k levels, where k is a constant.

The output of the time description can be incremental outputs based on progress at a given point in time. For example, if an animation starts at five seconds and continues for one second, then at 5.5 seconds the output is 0.5 which indicates the progress is half way along the animation.

The timing tree as input to one or more pixel shader(s) 302 essentially maps time to progress along the animation process. The timing texture information 212 is about evaluating the timing tree to determine progress. Once the progress is evaluated there is an animation description that indicates what to do with the progress texture information 304. For example, there can be color animation that indicates to animate from red to blue, and if progress is 0.5 (halfway), then an inbetween color of purple can be output as the current property value. Other examples include values related to animating opacity from 0 to 1. A progress of 0.5 maps to half opacity. Another animation is point animation where animation is performed on a position of an object as the object moves along a path defined by coordinates (0,0) to (100,100), and a progress of 0.5 relates to a move in position to coordinates (50,50). More elaborate examples include a spline key frame description, where spline evaluation includes evaluating the spline to determine how to map progress to position, and so on. Splines can also be used for the simple values such as tuple or color for different animation patterns.

The next stage of animation evaluation using the one or more pixel shader(s) 306 (similar to pixel shader(s) 218 of FIG. 2) includes taking the progress result (which states progress relative to animation), receiving a description of the function for animation (whether a color interpolation, a point interpolation, a double interpolation, etc.), and performing the interpolation based on the progress. In other words, the animation evaluation pixel shader(s) 306 takes the progress value and the interpolation description (as the animation texture information), and interpolates to the computed value. As illustrated, each step takes input texture information, and outputs texture information for the subsequent stage.

The output of the animation evaluation stage (pixel shader(s) 306) is the texture in video memory (e.g., some or all of memory subsystem 204 of FIG. 2) generated by the GPU that includes computed transform information, opacity information, color information, position information 308, and so on, for the next stage—transform composition, using one or more vertex shader(s) 310 (similar to vertex shader(s) 220 of FIG. 2). Thus, the timing texture information 212 uses the pixel shader(s) 302 to generate the progress texture information 304, and then the pixel shader(s) 306 sample textures to generate the animation transform opacity and colors texture 308. Thus far, this has all been performed using pixel shaders. The next stage applies this to the primitives. The vertex shader(s) 310 also receive as input transform hierarchy evaluation results 312 as texture information, and path vertex data 314 as texture information.

An output of the vertex shader(s) 310 is transformed vertex data 316. The vertex shader(s) 310 are used to apply computed animation data and scene graph data from the previous stage. If there is a color change, the vertex shader(s) 310 changes the color of the vertex color data or the vertex shader(s) 310 change the opacity by multiplying the opacity with the color of the per vertex data. Alternatively, the vertex shader(s) 310 change the position by multiplying the position component of the per vertex data with the input received from the result of the previous stage. Once the transformed vertex data 316 is obtained, path rasterization is performed using pixel shader(s) 318 to output the final scene rasterization 320 (similar to path rasterization 226 of FIG. 2).

Following is a series of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 4:
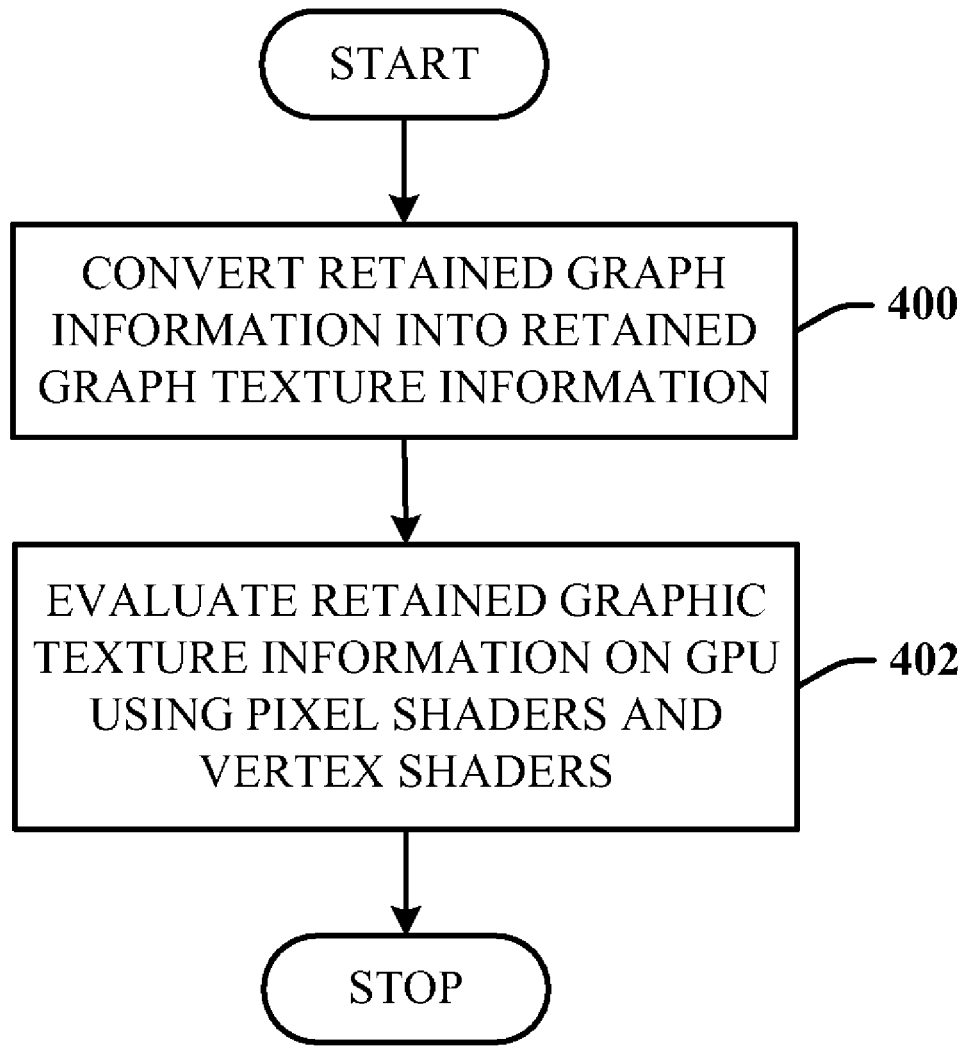
FIG. 4 illustrates a method of processing graphics.

FIG. 4 illustrates a method of processing graphics. At 400, retained graph information is converted into retained graph texture information. At 402, the retained graph texture information is evaluated on the GPU using pixel shaders and vertex shaders.

The method can further comprise storing animation and hierarchical scene graph information as part of the retained graph texture information, and processing progress texture information and animation texture information using the pixel shader.

The method can further comprise performing path rasterization using the pixel shader, and evaluating transform hierarchy, path vertex data, and computed animation transforms, positions, opacity and colors texture information. The method can further comprise processing the timing texture information using the pixel shader to output progress texture information. The method can further comprise storing timing node information in a first texture, animation node information in a second texture, and description of scene graph transforms in a third texture, and processing the timing node information, animation node information, and description of scene graph transforms to perform final scene rasterization.

Figure 5:
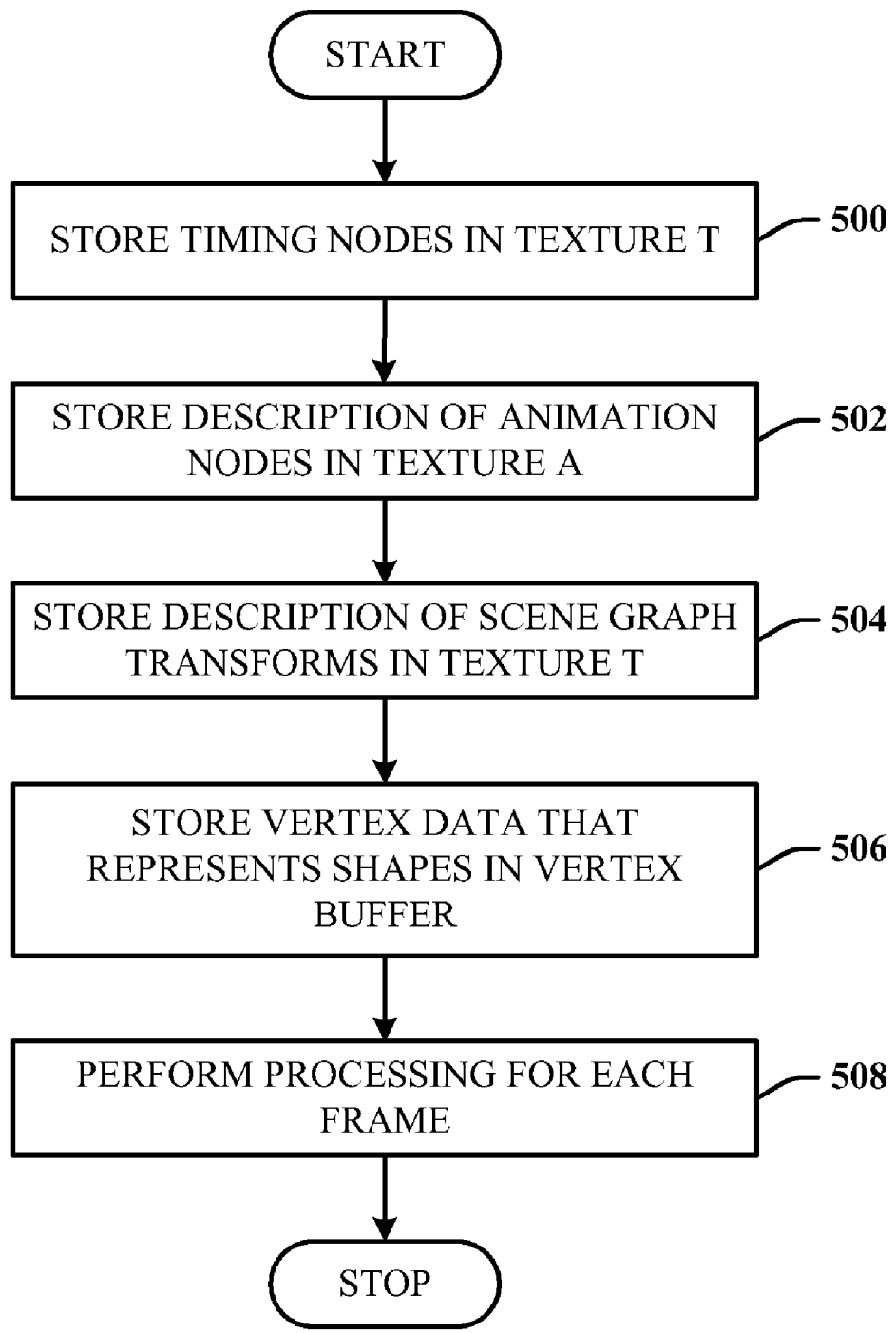
FIG. 5 illustrates a method of processing scene composition and animation on a GPU.

FIG. 5 illustrates a method of processing scene composition and animation on a GPU. At 500, a description of the timing nodes is stored in texture T. At 502, a description of the animation nodes is stored in texture A. At 504, a description of the scene graph transforms is stored in a texture X. To represent hierarchy, the texture can have a parent point that includes a texture unit to the parent element. At 506, vertex data is stored in a vertex buffer that represents shapes using a representation such as tessellation. Any representation can be used as long as the representation can be transformed entirely on the GPU. At 508, additional processing is performed for each frame.

Figure 6:
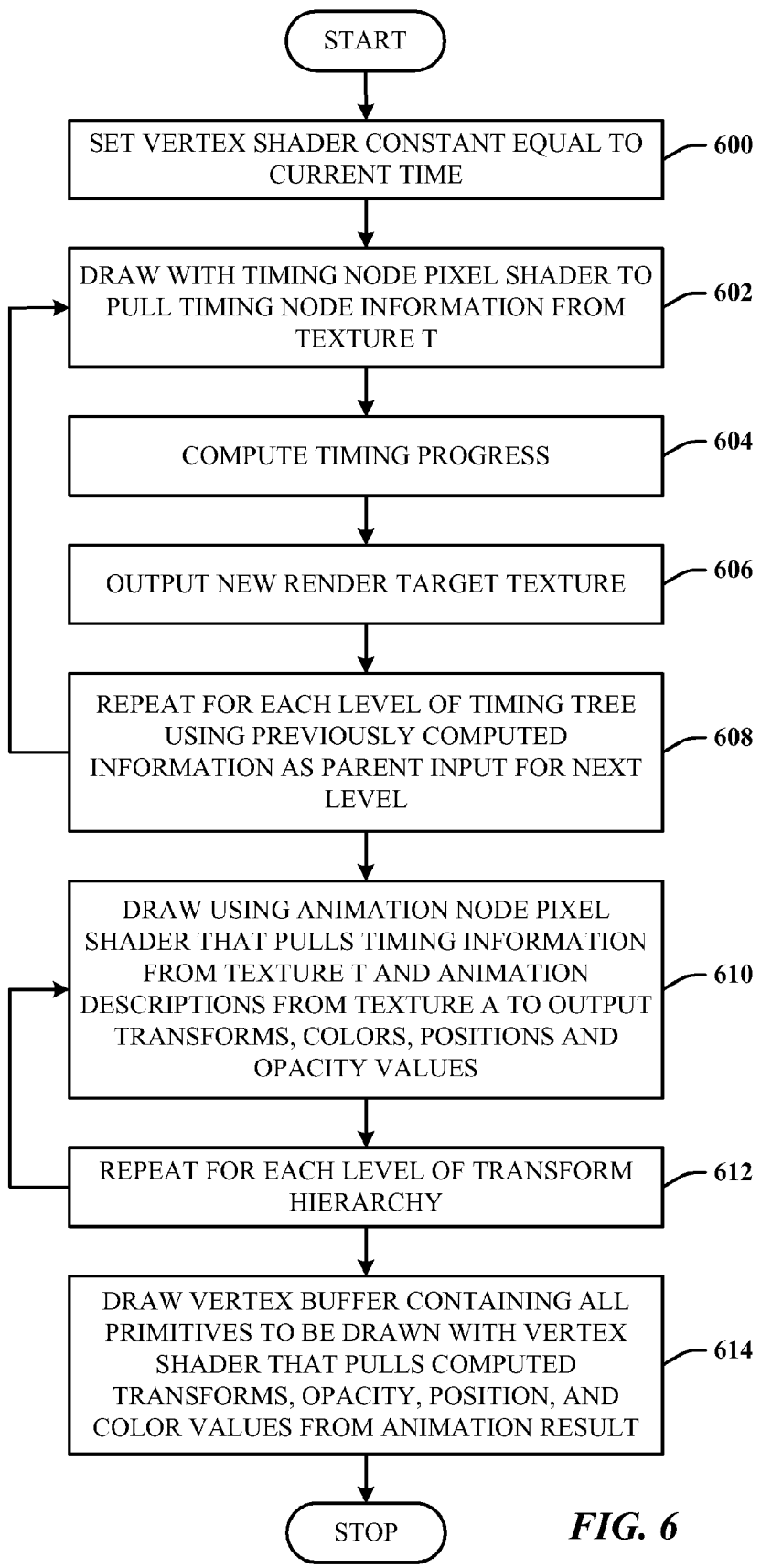
FIG. 6 illustrates a method of additional processing for each frame in the method of FIG. 5.

FIG. 6 illustrates a method of additional processing for each frame in the method of FIG. 5. The following steps are performed for each frame. At 600, a vertex shader constant is set equal to the current time. At 602, draw is performed with a timing node pixel shader that pulls timing node information from the texture T. At 604, the timing progress is computed. At 606, output is to a new render target texture. At 608, steps 602, 604, and 606 are repeated each level of the timing tree using the previous computed information as parent input for the next level. At 610, draw is performed with an animation node pixel shader that pulls timing information from texture T and animation descriptions from texture A to output transforms, colors, positions, and opacity values. At 612, for hierarchical transforms, step 610 is repeated for each level of the transform hierarchy. At 614, a vertex buffer is drawn that contains all primitives to be drawn with a vertex shader that pulls the computed transforms, opacity, position, and color values from the animation result render target texture.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 7:
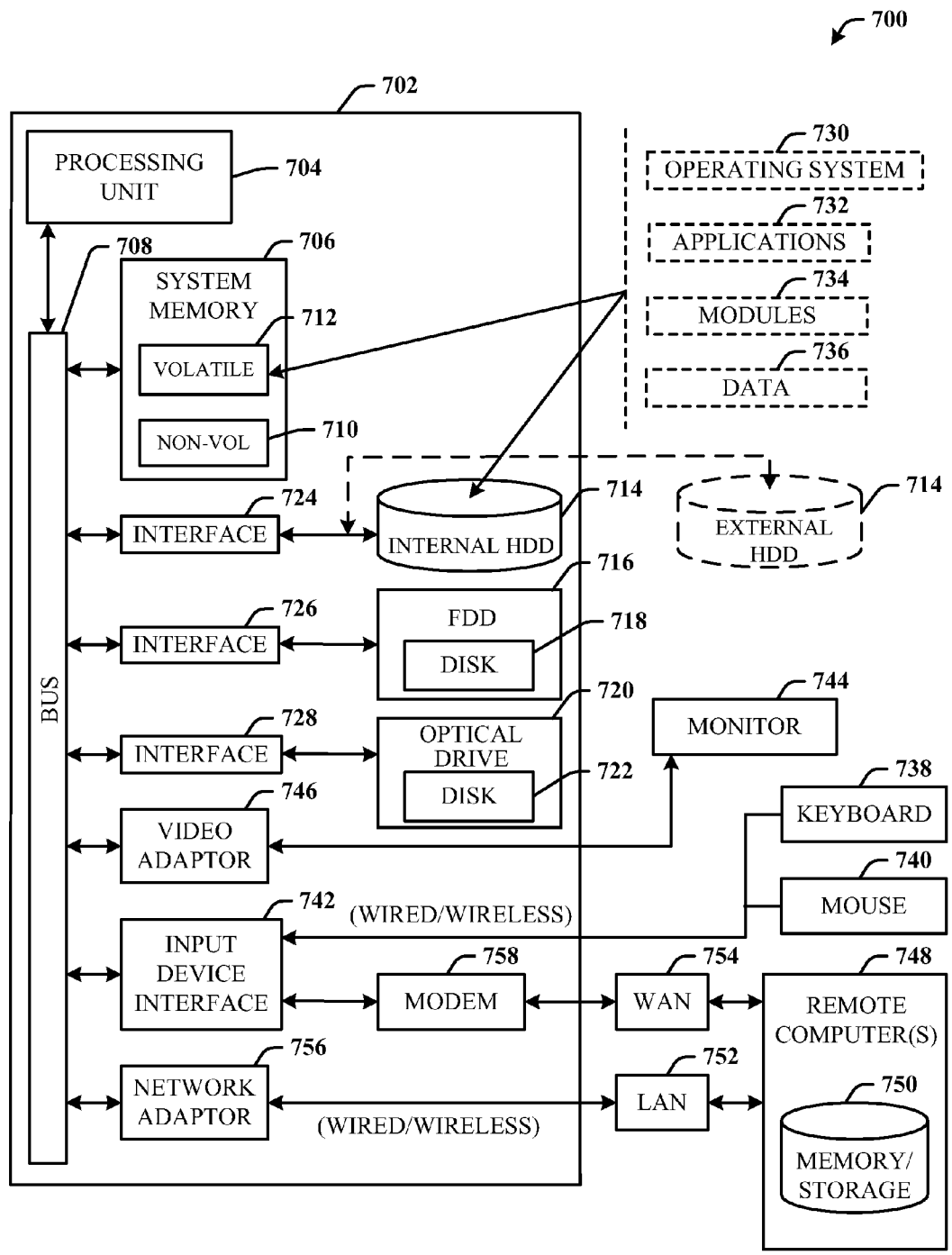
FIG. 7 illustrates a block diagram of a computing system operable to execute retained graph information in the GPU in accordance with the disclosed architecture.

Referring now to FIG. 7, there is illustrated a block diagram of a computing system 700 operable to execute retained graph information in the GPU in accordance with the disclosed architecture. In order to provide additional context for various aspects thereof, FIG. 7 and the following discussion are intended to provide a brief, general description of a suitable computing system 700 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 7, the exemplary computing system 700 for implementing various aspects includes a computer 702 having a processing unit 704, a system memory 706 and a system bus 708. The system bus 708 provides an interface for system components including, but not limited to, the system memory 706 to the processing unit 704. The processing unit 704 can be any of various commercially available processors. Dual microprocessors and other multi-processor architectures may also be employed as the processing unit 704.

The system bus 708 can be any of several types of bus structure that may further interconnect to a memory bus (with or without a memory controller), a peripheral bus, and a local bus using any of a variety of commercially available bus architectures. The system memory 706 can include non-volatile memory (NON-VOL) 710 and/or volatile memory 712 (e.g., random access memory (RAM)). A basic input/output system (BIOS) can be stored in the non-volatile memory 710 (e.g., ROM, EPROM, EEPROM, etc.), which BIOS are the basic routines that help to transfer information between elements within the computer 702, such as during start-up. The volatile memory 712 can also include a high-speed RAM such as static RAM for caching data.

The computer 702 further includes an internal hard disk drive (HDD) 714 (e.g., EIDE, SATA), which internal HDD 714 may also be configured for external use in a suitable chassis, a magnetic floppy disk drive (FDD) 716, (e.g., to read from or write to a removable diskette 718) and an optical disk drive 720, (e.g., reading a CD-ROM disk 722 or, to read from or write to other high capacity optical media such as a DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide nonvolatile storage of data, data structures, computer-executable instructions, and so forth. For the computer 702, the drives and media accommodate the storage of any data in a suitable digital format. Although the description of computer-readable media above refers to a HDD, a removable magnetic diskette (e.g., FDD), and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and volatile memory 712, including an operating system 730, one or more application programs 732, other program modules 734, and program data 736. All or portions of the operating system, applications, modules, and/or data can also be cached in the volatile memory 712. It is to be appreciated that the disclosed architecture can be implemented with various commercially available operating systems or combinations of operating systems.

A user can enter commands and information into the computer 702 through one or more wire/wireless input devices, for example, a keyboard 738 and a pointing device, such as a mouse 740. Other input devices (not shown) may include a microphone, an IR remote control, a joystick, a game pad, a stylus pen, touch screen, or the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, etc.

A monitor 744 or other type of display device is also connected to the system bus 708 via an interface, such as a video adaptor 746.

The video adaptor 746 can include the system 100, system 200, capabilities and functionality described with respect to the flow/block diagram 300, and the methods described in FIGS. 4-6. Alternatively, or in combination therewith, the computer 702 includes a mainboard (also called a motherboard) on which graphics processing capability is fabricated, and in which case, can include the system 100, system 200, capabilities and functionality described with respect to the flow/block diagram 300, and the methods described in FIGS. 4-6.

In addition to the monitor 744, a computer typically includes other peripheral output devices (not shown), such as speakers, printers, etc.

The computer 702 may operate in a networked environment using logical connections via wire and/or wireless communications to one or more remote computers, such as a remote computer(s) 748. The remote computer(s) 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, is connected to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A graphics processing system, comprising:
    a texture component for converting retained graph information into retained graph texture information that includes time information stored as time texture information and animation information stored as animation texture information; and
    a shader component for evaluating the retained graph texture information entirely on a graphics processing unit (GPU), the shader component including:
        a first pixel shader that evaluates the time texture information and outputs progress texture information based on the time texture information;
        a second pixel shader that receives the progress texture information and the animation texture information, interpolates the animation texture information based on the progress texture information, and outputs at least one of color texture information, position texture information, or opacity texture information based on the progress texture information and the animation texture information; and
        a vertex shader that receives at least path vertex data and texture information output from the second pixel shader, and outputs transformed vertex data based on the path vertex data and texture information output from the second pixel shader.

2. The system of claim 1, wherein the first and second pixel shaders of the shader component compose multiple levels of a transform hierarchy and output transform hierarchy evaluation information.

3. The system of claim 2, wherein the vertex shader further receives the transform hierarchy evaluation information and outputs the transformed vertex data based on the transform hierarchy evaluation information, the path vertex data, and the texture information output from the second pixel shader.

4. The system of claim 3, wherein the vertex shader applies transforms to geometry to generate the transformed vertex data.

5. The system of claim 1, wherein the retained graph texture information includes transform information stored as transform texture information.

6. The system of claim 5, wherein the vertex shader further receives the transform texture information and outputs the transformed vertex data based on the path vertex data, the transform texture information, and at least one of the color texture information, the position texture information, or the opacity texture information output from the second pixel shader.

7. The system of claim 1, wherein the retained graph texture information further includes hierarchical scene graph information and the shader component evaluates scene graph transforms.

8. The system of claim 1, wherein the shader component rasterizes paths.

9. The system of claim 1, further comprising a third pixel shader that receives the transformed vertex data, performs path rasterization and outputs final scene rasterization.

10. A graphics processing system, comprising:
    a texture component of a GPU for converting retained graph information into retained graph texture information that includes time information stored as time texture information;
    one or more pixel shaders of the GPU for evaluating the time texture information and outputting progress texture information based on the time texture information; and
    a vertex shader of the GPU,
        the vertex shader and at least one of the one or more pixel shaders configured to evaluate transform composition as transform texture information.

11. The system of claim 10, wherein the retained graph texture information includes the time texture information, animation texture information, and the transform texture information, all evaluated entirely on the GPU.

12. The system of claim 10, further comprising a pixel shader for evaluating animation texture information and the progress texture information.

13. The system of claim 10, further comprising a shader for rasterizing paths.

14. The system of claim 10, wherein the one or more pixel shaders further evaluates a hierarchy of transforms and the vertex shader applies resulting transforms to path vertex data.

15. A method of processing graphics, comprising:
converting retained graph information including timing information into retained graph texture information including timing texture information;
evaluating the retained graph texture information on a GPU using one or more pixel shaders and one or more vertex shaders;
processing the timing texture information using the one or more pixel shaders to output progress texture information based on the timing texture information and processing the progress texture information and animation texture information using the one or more pixel shaders to generate animation transform opacity and colors texture information;
storing timing node information in a first texture, animation node information in a second texture, and description of scene graph transforms in a third texture; and
processing the timing node information, animation node information, and description of scene graph transforms to perform final scene rasterization.

16. The method of claim 15, further comprising storing animation and hierarchical scene graph information as part of the retained graph texture information and evaluating scene graph transforms based on the animation and hierarchical scene graph information.

17. The method of claim 15, further comprising performing path rasterization using the one or more pixel shaders.

18. The method of claim 15, further comprising evaluating transform hierarchy, path vertex data, and computed animation transforms, positions, opacity and colors texture information using the one or more vertex shaders.

* * * * *